3,732,126
TREATMENT OF METALS

Harold Ralph William Cobb, Didcot, and Eric Brown, Wantage, England, assignors to United Kingdom Atomic Energy Authority, London, England
No Drawing. Continuation of application Ser. No. 649,454, June 28, 1967. This application July 20, 1970, Ser. No. 64,021
Claims priority, application Great Britain, June 30, 1966, 29,538/66
Int. Cl. C21d 7/02, 9/08; C22f 1/00
U.S. Cl. 148—11.5 R     9 Claims

ABSTRACT OF THE DISCLOSURE

A method of treating metals which comprises working a metal to produce a varying amount of strain hardening throughout the cross section of metal and heat treating the metal to give a fine grain size at a surface of the metal and a coarser grain size in the interior of the metal.

---

This application is a continuation of application Ser. No. 649,454 filed June 28, 1967, and now abandoned.

The present invention relates to the treatment of metals and is particularly but not exclusively concerned with the treatment of metals to be used as fuel cans in nuclear reactors.

It will be known that the fuel cans in a nuclear reactor are subjected to stresses due to the external coolant pressure and the internal pressures due to the expansion of the fuel material in the can and also fission product gases and vapours released by the fuel. During start-up or shut down of the reactor, temperature changes occur, and these produce variations in the internal pressures acting on the fuel can with a consequent flexing of the can. Repeated flexing of the can may result in premature failure of the can and possible release of highly active fission products into the coolant.

According to the present invention there is provided a method of treating metals comprising working a metal to produce a varying amount of strain hardening throughout the cross section of the metal and heat treating the metal to give a fine grain size at a surface of the metal and a coarser grain size in the interior of the metal.

The dual grain size produced by the method of the present invention results in a longer plastic strain life for the material so treated. The fine grain structure at the surface of the metal delays fractures at the metal surface resulting in rupture of the metal, whilst the coarser grain size of the remaining metal increases the stress required to produce a certain degree of plastic deformation.

The invention may be applied to the treatment of tubular material which is intended for fuel cans and in such a case the working of the metal tube may be by external planetary swaging using a central mandrel or by means of an internal swaging device. In both cases it is intended that the fine grain should be produced on the internal surface of the tube, but it will be appreciated that the use of an external swage will produce fine grain on the external surface of the tube also.

In general, there is a critical amount of strain which, when imparted to a tube, produces relatively large grains on subsequent heat treatment at recrystallisation temperatures. Using a planetary swaging technique it is possible to control the amount of work on the tube so that the critical strain is established in the interior of the material and this leads to the formation of coarse grains in the material when suitably heat treated. However, the amount of work imparted to the surfaces exceeds the critical amount and thus a finer grain structure is obtained at the surfaces. The formation of grains is due to the presence of recrystallisation nuclei and if only a few such nuclei are formed large grains will result. In the case of 20/25 niobium stainless steels of the type proposed for use as the fuel cans in an advanced gas-cooled reactor, when formed into tubes of 0.57 inch internal diameter and 0.015 inch wall thickness, the critical strain for large grain formation is established with a reduction in wall thickness of 10 percent. It will be appreciated that the amount of work which must be imparted to the surface to obtain the fine grain size exceeds the amount of work required to obtain a coarse grain size throughout the rest of the metal and thus varying amounts of strain hardening must be induced across the metal to produce a dual grain size.

Recrystallisation of the metal occurs at higher temperatures for smaller degrees of strain hardening. The recrystallisation temperature is however lower if the time of annealing is increased. This fact may be used to provide a heat treatment giving a dual grain sized structure, without working the metal in the critical strain range, for example, a tube may be externally swaged on a close fitting mandrel to above 40% deformation and then annealed firstly at a low temperature to recrystallise the surface layers and secondly at a higher temperature whereby recrystallisation of the interior of the metal occurs to give the desired dual grain structure. A double annealing procedure as described is preferred to a sequence of operations involving only a single anneal since the former permits more flexibility in the process and this is desirable in practice.

The grain size of the surface may conveniently be about 7–12 microns, whilst the coarse grains may have a size of 25–50 microns. A surface layer which is only 3 grains deep may prove adequate to allow the material to be strained without fracture and thus for a tube of wall thickness 0.015 inch, the surface layer will comprise about 10% of the total thickness of the metal.

It is thought that formation of a dual grain size may be assisted by the presence in the metal of grain boundary precipitates which have a grain growth inhibiting effect.

It will be appreciated that the amount of work performed on the metal and the time and temperature of the subsequent heat treatment will be dependent on the metal being treated.

Fuel cans produced in accordance with the present invention have a longer plastic strain life than cans used hitherto and thus may be particularly useful in load following reactors, that is reactors the output of which is varied in accordance with power requirements, since in such reactors the temperature is frequently varied and the can is thus subjected to repeated flexing.

It will be appreciated that the desired variation in strain hardening to produce dual grain size may be achieved by any suitable means and that presently planetary swaging is preferred although machining of the surface of the metal may also produce the desired variation in strain hardening. If a double anneal is used, the interior of the metal may be strain hardened beyond the critical strain for coarse grain production since it appears that the first low temperature, anneal produces some recovery of the inner structure whereby the second anneal results in a coarse grain in the inner structure.

The strain hardening is conveniently effected by working the metal at ambient temperature (about 20° C.), but working may be effected at any convenient temperature below the recrystallisation temperature.

In order that the present invention may be more readily understood, several embodiments thereof are set out in the following examples.

EXAMPLE 1

A 20/25 stainless steel tube of 0.57 inch internal diameter and 0.030 inch wall thickness was planetary swaged to reduce the wall thickness by 50% using an external swage with a close fitting internal mandrel. The worked tube was then heat treated by annealing at 800° C. for 80 hours followed by a 10 minute anneal at 1050° C. The grain size at both surfaces was found to be about 10–12 microns and the internal grain size was about 25–30 microns.

EXAMPLE 2

The working procedure of Example 1 was repeated on a similar tube. The worked tube was annealed at 950° C. for 10 minutes and then at 1050° C. for 10 minutes. The grain structure was similar to that obtained in Example 1.

EXAMPLE 3

A 20/25 stainless steel tube of internal diameter 0.570 inch and wall thickness 0.015 inches was internally planetary swaged to an internal diameter of 0.572 inch. The swaged tube was then subjected to a single anneal at 950° C. for half an hour. The grain size at the internal surface was about 7 microns, at the external surface 10–12 microns and in the interior of the metal the grain size was about 25–30 microns.

We claim:

1. A method of treating a tubular metal object to increase its plastic strain life comprising: working the metal object to produce a varying amount of strain hardening throughout the cross section of the metal tube, the amount of strain hardening at a surface of the metal tube being greater than that at a location remote from said surface and sufficient to produce a fine grain size at the surface of the metal upon subsequent heat treatment at recrystallizing temperature, the amount of strain hardening at said location remote from said surface being less than that at said surface of the metal tube and sufficient to produce a coarse grain size upon subsequent treatment at recrystallizing temperature; and heat treating the worked tube at recrystallization temperature to effect recrystallization throughout the metal tube to give a fine grain size at the tube surface and a coarser grain size at said location remote from said surface.

2. A method according to claim 1 wherein said location remote from said tube surface is the surface of said tube remote from the first-mentioned tube surface, the varying amount of strain hardening thus extending throughout the whole cross section of said tube.

3. A method according to claim 1 wherein said tube surface is the inner tube surface and wherein said location remote therefrom is the outer tube surface, the varying amount of strain hardening thus extending throughout the whole cross section of said tube.

4. A method according to claim 1 wherein said location remote from said tube surface is within the interior of the metal intermediate the tube surfaces.

5. A method according to claim 4 wherein the amount of strain hardening at the surface of said tube remote from the first-mentioned tube surface is greater than that at said location intermediate the tube surfaces and sufficient to produce a fine grain structure at said remote surface upon subsequent heat treatment at recrystallizing temperature, whereby, after heat treating said tube at recrystallizing temperature, the grain size of both surfaces of said tube is coarser than at said location intermediate the tube surfaces.

6. A method according to claim 1 wherein the grain size at said location remote from said tube surface is substantially larger than that at said surface.

7. A method according to claim 6 wherein the grain size at said location remote from said tube surface is larger than that at said surface by a factor of at least 25/12.

8. A method according to claim 7 wherein the fine grain size is from 7–12 microns.

9. A method according to claim 1 wherein said step of heat treating the tube comprises heating the tube first at a first, recrystallizing temperature to recrystallize the more highly strain hardened portion of said tube and subsequently at a second recrystallizing temperature higher than said first recrystallizing temperature to recrystallize the less strain hardened portion of said tube.

References Cited
UNITED STATES PATENTS

| | | | |
|---|---|---|---|
| 3,323,953 | 6/1967 | Lesney | 148—39 |
| 3,347,715 | 10/1967 | Pfeil | 148—12 |
| 2,393,363 | 1/1946 | Gold et al. | 148—154 |

WAYLAND W. STALLARD, Primary Examiner

U.S. Cl. X.R.

148—12